(12) United States Patent
Du

(10) Patent No.: US 6,973,055 B1
(45) Date of Patent: Dec. 6, 2005

(54) NETWORK WITH SEVERAL NETWORK CLUSTERS FOR WIRELESS TRANSMISSION OF PACKETS

(75) Inventor: Yonggang Du, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/557,600

(22) Filed: Apr. 25, 2000

(30) Foreign Application Priority Data

Apr. 28, 1999 (DE) ................................. 199 19 177

(51) Int. Cl.[7] ............................................. H04H 1/00
(52) U.S. Cl. ....................... 370/312; 370/432; 370/473
(58) Field of Search ............................ 370/310.1, 312, 370/314, 345, 432, 473, 474, 338, 337, 347, 370/310.2

(56) References Cited

U.S. PATENT DOCUMENTS

| | | | |
|---|---|---|---|
| 4,507,781 A * | 3/1985 | Alvarez et al. ............... | 370/266 |
| 4,897,835 A * | 1/1990 | Gaskill et al. ............... | 370/314 |
| 5,404,355 A * | 4/1995 | Raith ........................... | 370/311 |
| 5,603,081 A * | 2/1997 | Raith et al. ................. | 455/435.3 |
| 5,742,599 A * | 4/1998 | Lin et al. .................... | 370/395.65 |
| 5,936,949 A * | 8/1999 | Pasternak et al. .......... | 370/328 |
| 5,940,381 A * | 8/1999 | Freeburg et al. ........... | 370/331 |
| 6,084,888 A * | 7/2000 | Watanabe et al. .......... | 370/473 |
| 6,389,550 B1 * | 5/2002 | Carter ........................... | 714/1 |
| 6,442,146 B1 * | 8/2002 | Onodera et al. ............ | 370/321 |
| 6,442,149 B1 * | 8/2002 | Nakano et al. ............. | 370/328 |
| 6,445,683 B1 * | 9/2002 | Nobuyasu et al. ......... | 370/310.1 |
| 6,512,747 B1 * | 1/2003 | Umeuchi et al. ........... | 370/310.1 |
| 6,522,641 B1 * | 2/2003 | Siu et al. ..................... | 370/338 |
| 6,560,206 B1 * | 5/2003 | Naden et al. ............... | 370/310.1 |

FOREIGN PATENT DOCUMENTS

| | | | | |
|---|---|---|---|---|
| EP | 621708 A2 * | 10/1994 | .......... | H04L 12/28 |
| EP | 755164 A2 * | 1/1997 | .......... | H04Q 11/04 |

OTHER PUBLICATIONS

Diaz-Hernandez, A. "Impact of the Mobile GSM-F, Digital Radio and Satellite Technologies in Rural Communications for the Next Generations". Telecommunications: Fourth IEEE Conference. Manchester, UK. Apr. 18-21, 1993. pp. 318-321.*
Walke, B. et al. "CELLPAC: A Packet Radio Protocol Applied to the Cellular GSM Mobile Radio Network". Vehicular Technolog Conference: Gateway to the Future Technology in Motion, 41st IEEE. St. Louis, MO. May 19-22, 1991. pp. 408-413.*
By Bernd Grob: "Integration von GSM und Intranet" (Integration of GSM and Intranet), Feb. 18, 1998, PP. 58-60.

* cited by examiner

*Primary Examiner*—John Pezzlo
*Assistant Examiner*—Donald L Mills
(74) *Attorney, Agent, or Firm*—Larry Liberchuk

(57) ABSTRACT

A network has several network clusters each including at least one wireless network node which is designed for the wireless transmission of packets in time slots of given length in a time multiplex process. The length of the packets has at least a value which is smaller than the length of a fixedly given time slot. A wireless network node joins together several packets into a superpacket and sends the superpacket via a point-to-multipoint connection to all wireless network nodes authorized for the data transmission. Upon reception of a superpacket, a wireless network node will derive a packet from the superpacket if the destination of this packet lies within the relevant associated network cluster.

20 Claims, 1 Drawing Sheet

NETWORK WITH SEVERAL NETWORK CLUSTERS FOR WIRELESS TRANSMISSION OF PACKETS

Figure 1:
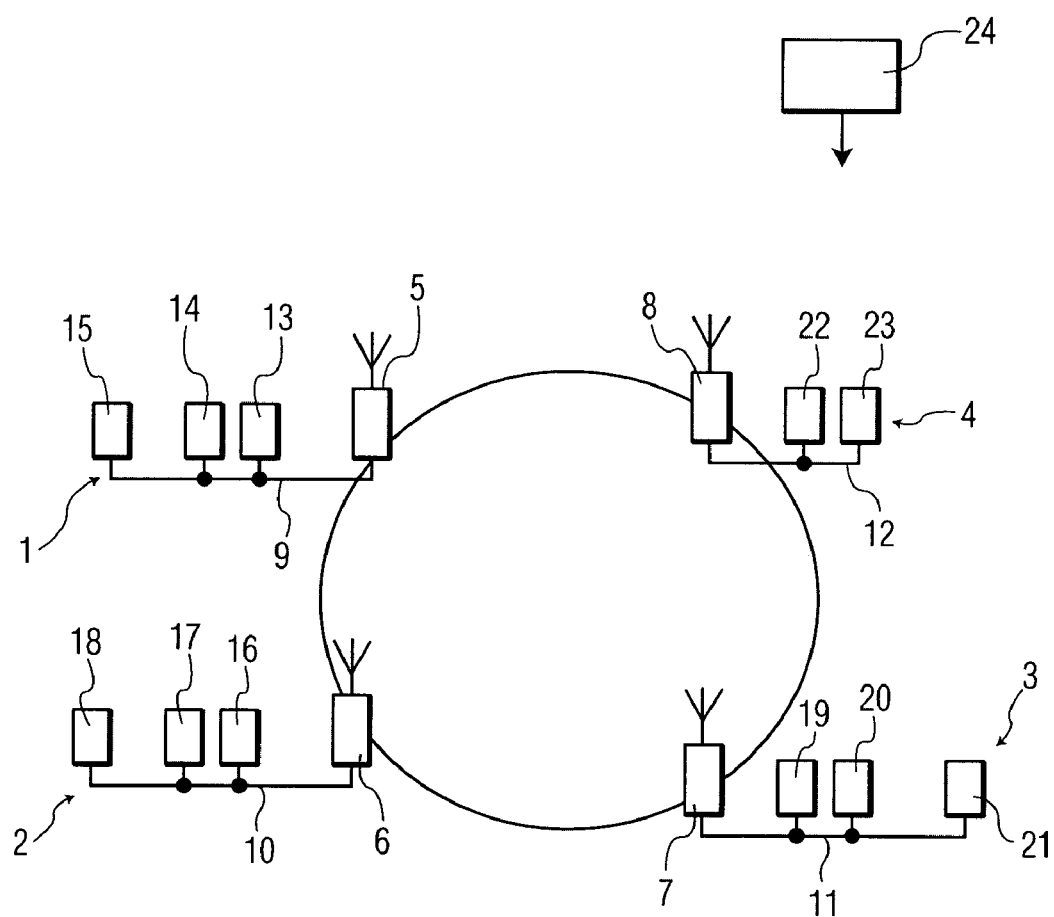

The invention relates to a network with several network clusters of at least one wireless network node each, which network node is designed for the wireless transmission of packets in time slots of given length in a time multiplex process, the variable length of said packets having at least a value which is smaller than the length of a fixedly given time slot.

The article by Bernd Groβ: "Integration von GSM und Intranet" (Integration of GSM and Intranet), Funkschau 18, 1998, pp. 58 to 60, describes a network which comprises several network clusters. Such a network cluster consists of a GSM base station (GSM= Global System for Mobile communication) and further network units such as, for example, a gatekeeper, several terminals, a gateway, etc. The GSM base station is coupled to a network operating in accordance with the Internet protocol (IP network) via an Intranet Mobile Cluster. Data are transmitted in packets between the GSM base station and a mobile phone. The transmission takes place in a connection-oriented manner.

The invention has for its object to provide a network in which the transmission between several network clusters or wireless network nodes takes place efficiently.

This object is achieved by means of a network of the kind mentioned in the opening paragraph where a wireless network node is provided for combining several packets into a superpacket and for transmitting the superpacket to all wireless network nodes authorized for the data transmission via a point-to-multipoint link, and where a wireless network node after reception of a superpacket is designed to derive a packet from the superpacket if the destination of the packet lies in the relevant associated network cluster.

The network according to the invention constitutes a network formed from wireless network nodes in which payload data are transmitted wirelessly as packets in a time multiplex process. The length of the packet to be transmitted is usually smaller than the length of the time slots. All time slots have the same length. The packets are joined together into a superpacket in a transmitting wireless network node and inserted into at least one time slot. The joining together of the packets into a superpacket is independent of the destinations of the packets. Such a superpacket is sent to all other wireless network nodes authorized for the data transmission. A superordinated management system decides who takes part in a data transmission in the wireless network. A wireless network node which receives a superpacket derives from the superpacket those packets whose destinations lie in its associated network cluster.

The formation of superpackets, in particular in the case of packets whose length is much smaller than the length of the time slots, achieves that the time slots are more fully utilized than in the case of a transmission of one packet per time slot. The arrangement with point-to-multipoint connections in addition reduces the expenditure as compared with point-to-point connections, because a management of connection lists on the transmitting side is not required.

A superpacket is segmented when the length of the superpacket exceeds the length of the time slots, and dynamic allocation of time slots to superpackets to be segmented is provided.

The control of the radio traffic between the wireless network nodes is carried out by one of the wireless network nodes. This network node is referred to as the central network node.

A packet destined for a network node is singled out from a superpacket by having the wireless network node which receives a packet compare the address identification in the control field of the packet with an address which belongs to the associated network cluster and which identifies the destination. A wireless network node for this purpose requires a table for storing all addresses of the associated network cluster.

A further task of the management system is provided for the switching-over from a point-to-multipoint connection to a point-to-point connection, which is necessary in certain cases. A wireless network node is designed, for example, for transmitting a key via a point-to-multipoint connection and for transmitting coded data via a point-to-point connection.

The invention also relates to a wireless network node in a network cluster of a network for the wireless transmission and reception of packets in time slots of given length in a time multiplex process.

An embodiment of the invention will now be explained in more detail with reference to FIG. 1, which shows a network with several fixed network nodes and wireless network nodes.

FIG. 1 shows a network with several network clusters 1 to 4. A network cluster 1 to 4 comprises a wireless network node (5 to 8) and at least one fixed network node (13 to 23). A fixed network node (13 to 23) is understood to be a network node which belongs to a sub-network and which exchanges data with other network nodes of a sub-network through wire connections. A wireless network node (5 to 8) forms part of a wireless network in which wireless network nodes exchange data through a wireless medium. A wireless transmission is, for example, a radio, infrared, or ultrasound transmission, or a transmission of a similar type.

In the network shown by way of example in FIG. 1, the wireless network nodes 5 to 8 form a wireless network in which data are transmitted by radio transmission over radio paths. The TDMA (Time Division Multiplex Access) process is used in the radio transmission, by means of which data are transmitted in time slots of a frame in the time multiplex mode. These time slots (channels) have a fixed length, i.e. they are capable of accommodating a given number of bytes per time slot.

The wireless network nodes 5 to 8 are coupled each to at least one fixed network node (13 to 23) via a respective wire interface (9 to 12) in the respective network cluster 1 to 4. Such fixed network nodes 13 to 23 may be, for example, bridge nodes through which the data can flow from other bridge nodes or from the wireless network nodes 5 to 8 into a sub-network associated with this bridge node. The network cluster 1 comprises an interface 9 which couples the wireless network node 5 to the fixed network nodes 13 to 15. The wireless network node 6 forms part of the network cluster 2 and is coupled to the fixed network nodes 16 to 18 via the interface 10. The other two network clusters 3 and 4 comprise the wireless network node 7 and the fixed network nodes 19 to 21 (network cluster 3), and the wireless network node 8 and the fixed network nodes 22 and 23 (network cluster 4). The network nodes 7 and 19 to 21 are coupled to one another in the network cluster 3 via the interface 11, and the network nodes 8, 22, and 23 are coupled to one another in the network node 4 via the interface 12. The wireless network consisting of the wireless network nodes 5 to 8 is designed for the transmission of data between the individual network clusters 1 to 4.

A wireless network node 5 to 8 essentially comprises a radio device. Such radio devices, which are not shown in any detail here, are known and usually comprise an interface circuit, a protocol device, a modem, a high-frequency circuit, and an antenna. The interface circuit, which carries out a format adaptation of the received data, is connected to a wire-bound interface (9 to 12) and exchanges data with the interface and with the protocol device. The protocol device, which is constructed, for example, as a processor system, processes the data received from the interface circuit or the modem in accordance with protocols for the LLC stage (LLC=Logical Link Control) and the MAC stage (MAC=Medium Access Control). The MAC stage controls the multiple access of a radio device to the radio transmission medium, and the LLC stage carries out a traffic flow and error check. The high-frequency circuit transmits data received from the antenna via the modem to the protocol device. Furthermore, the antenna transmits data originating from the protocol device and passed on by the modem and the high-frequency circuit.

In the wireless network formed by the network nodes 5 to 8 it is, for example, the wireless network node 5 which has the function of a base station in the wireless network and which is denoted the central node. The wireless node 5 controls the radio traffic in the wireless network, i.e. the central node 5 controls the radio synchronization, the medium access control, the establishment of the connections, etc. A connection-oriented packet transmission method is used for the transmission of the payload data in the wireless network. Such a packet transmission method is provided, for example, in the Internet protocol.

Before payload data are transmitted in packets over the wireless network, a connection is built up by the central node 5. A network node 6, 7 or 8 signals to the central node 5 which network nodes are to be sent packets, which are accommodated in one or several time slots of fixed length. The central node assigns one or several time slots with a certain identification number ID to a network node 6, 7 or 8. The network node 5 may also assign one or several time slots with an identification number ID to itself, i.e. when it wants to transmit packets to other network nodes. A condition here is that it has first been laid down by a superordinated management system 24 which network clusters exchange packets with one another. Connections can be built up only with these network clusters.

Be it assumed that the length of the packets is smaller than the length of the time slots in most cases and that the various packets must not be sent to one given network cluster 1 to 4 only. According to the invention, a wireless network node (5, 6, 7 or 8) forms a superpacket from the packets and sends this superpacket to all other wireless network nodes (5, 6, 7 and/or 8) or network clusters (1, 2, 3 and/or 4), as applicable, after a connection has been built up by means of a point-to-multipoint link.

A packet comprises a payload data field for the transport of useful data and a header for address recognition, the latter indicating the destination of a packet. A destination is a network node situated in a network cluster 1 to 4, or other network units not described in any detail here.

For example, the central node 5 assigns a channel with the ID=1 for a point-to-multipoint connection for the transmission of a superpacket from the network node 6 to the network nodes 5, 7 and 8, and a channel with the ID=2 for a point-to-multipoint connection for the transmission of a superpacket from the network node 8 to the network nodes 5, 6 and 7.

After a wireless network node 5, 6, 7 or 8 has received a superpacket, it is tested whether an address recognition in a packet leads to a match with an address in the relevant network cluster 1, 2, 3 or 4. If the address recognition and the address of a network node or a network unit in the network cluster match one another, the wireless network node 5, 6, 7 or 8 takes out the packet which contains the recognized address. A wireless network node comprises a table in which all addresses of its associated network cluster are listed.

A time slot for a point-to-multipoint connection has a certain programmed fixed length or capacity. For example, such a time slot may be capable of accommodating 48 bytes. If a superpacket composed of several packets exceeds the length of the time slot, the superpacket is segmented into cells, and the cells are distributed over several time slots. The central node 5 dynamically assigns the time slots to a superpacket segmented into cells, i.e. these cells are inserted into several time slots of a frame or into one or several time slots of several frames. It may happen here that the length of the final cell is smaller than the length of the time slot, whereas the length of the previously sent cell is equal to the length of a time slot. A cell whose length is smaller than the length of the time slot is filled up with bits which have no meaning. Such bits without meaning are called empty bits. All network nodes which receive cells of a superpacket reassemble the superpacket from the cells received. This re-assembly is carried out, for example, on the basis of a cell recognition in a cell. The individual packets are regained from the superpacket, and a packet containing an address identification corresponding to the address of a network node or a network unit of the network cluster 1 to 4 is passed on for further processing. The packets destined for a network node or a network unit of a network cluster 1 to 4 are passed on by the associated wireless network nodes 5 to 8. The remaining packets of the superpacket are erased, i.e. those packets whose address identifications do not correspond to destinations in the network cluster 1 to 4 of the wireless network node 5 to 8 which receives the superpacket.

For example, six packets are present having 10, 20, 20, 40, 30, and 40 bytes. A superpacket of 160 bytes is formed from these packets. It is assumed that the channel capacity is 48 bytes. The superpacket is subdivided into four cells. Three cells contain 48 bytes and the final cell contains 16 bytes of payload data. This final cell will be filled up with empty bits. The formation of superpackets achieves that the available channel capacity is utilized more fully than, for example, in the case of a transmission with one packet per channel each time. Furthermore, the establishment of exclusively point-to-multipoint connections means that the use of tables in a wireless network node 5 to 8 for the establishment of connections is not necessary.

It is possible for certain applications to build up a point-to-point connection instead of a point-to-multipoint connection. Such applications arise when packets are to be transmitted which are longer than the fixedly given time slots in most cases. This decision is taken by the superordinated management system 24, which controls inter alia the wireless network nodes 5 to 8, and a wireless network node 5 to 8 is capable of identifying a point-to-point connection or a point-to-multipoint connection from a control information in the control field of the packet.

A point-to-point connection should also be established where coded data are transmitted between only two wireless networks, which data must not be recognized by the other wireless network nodes. For this purpose, for example, the central wireless node 5 sends the key for decoding the coded data to all other wireless network nodes 6 to 8 via a point-to-multipoint connection.

What is claimed is:

1. A network comprising:
several network clusters each network cluster having at least one wireless network node and at least two fixed network nodes, each of the at least two fixed network nodes belonging to a sub-network and exchanging data with other fixed network nodes of the sub-network through wire connections, each of the at least two fixed network nodes and the other fixed network nodes being coupled to a respective wireless network node of the at least one wireless network node via a respective wire interface, each of the at least one wireless network node including a transmitter for the wireless transmission of packets in time slots of given length in a time multiplex process, the variable length of the packets having at least a value which is smaller than the length of a fixedly given time slot,
wherein a transmitting wireless network node of the wireless network nodes is configured for combining several packets into a superpacket and for transmitting the superpacket to all wireless network nodes authorized for the data transmission via a point-to-multipoint link,
wherein the superpacket is transmitted to all wireless network nodes in one or more time slots of the fixedly given time slots wherein each of the one or more time slots includes at least two packets of the superpacket, and
wherein a receiving wireless network node of the wireless network nodes after reception of the superpacket is designed to extract a packet from the superpacket if the destination of the packet of the superpacket lies in a network cluster corresponding to the receiving wireless network node;
the transmitting wireless network node being configured for segmenting the superpacket into cells when the length of the superpacket exceeds the length of the fixedly given time slots, and for inserting the cells into several time slots, wherein each cell includes at least two packets from the superpacket, and
the receiving wireless network node which receives the cells being configured for forming the superpacket from the cells.

2. A network as claimed in claim 1, wherein the transmitting wireless network node is designed for inserting the cells into several time slots of a frame or into one or several time slots of several frames.

3. A network as claimed in claim 1, wherein one of the wireless network nodes from among the wireless network nodes which form a wireless network is constructed so as to form a central node which is designed to control the radio traffic.

4. A network as claimed in claim 1, wherein the receiving wireless network node which receives a packet is designed for comparing the address identification in the control field of the packet with an address which belongs to the associated network cluster and which identifies the destination.

5. A network as claimed in claim 4, wherein the receiving wireless network node contains a table for the storage of all addresses of the associated network cluster.

6. A network as claimed in claim 4, wherein the receiving wireless network node derives a relevant packet of the packets from the superpacket, the relevant packet having the address designation belonging to the associated network cluster.

7. A network as claimed in claim 1, further comprising a management system which controls at least one of the wireless network nodes such that the at least one wireless network node provides the establishment of point-to-point connections only instead of point-to-multipoint connections.

8. A network as claimed in claim 7, wherein the transmitting wireless network node is designed for sending a key via a point-to-multipoint connection and for sending coded data via a point-to-point connection.

9. A network as claimed in claim 1, wherein the transmitting wireless network node is designed for inserting the cells into several time slots of several frames.

10. A wireless network node in a network cluster of a network, the wireless network node including a transmitter designed for the wireless transmission of packets in time slots of given length in a time multiplex process, the variable length of the packets having at least a value which is smaller than the length of a fixedly given time slot,
wherein the wireless network node is designed for combining several packets into a superpacket and for transmitting said superpacket via a point-to-multipoint connection to all wireless network nodes authorized for the data transmission; and
wherein the superpacket is transmitted to all wireless network nodes in one or more time slots of the fixedly given time slots wherein each of the one or more time slots includes at least two packets of the superpacket, and
the wireless network node being further configured for segmenting the superpacket into cells when the length of the superpacket exceeds the length of the fixedly given time slot, and for inserting the cells into several time slots so that a receiving wireless network node which receives the cells forms the superpacket from the cells; and
the wireless network node further including means for coupling to at least two fixed network nodes via a respective wire interface, and
wherein the at least two fixed network nodes belong to a sub-network and exchange data with other fixed network nodes of the sub-network through wire connections.

11. A wireless network node in a network cluster of a network, the wireless network node including a receiver designed for the wireless reception of packets in time slots of given length in a time multiplex process, the variable length of the packets having at least a value which is smaller than the length of a fixedly given time slot,
wherein the wireless network node is designed so as to extract a packet from a superpacket after reception of the superpacket if the designation of one of the packets of the received superpacket lies within the network cluster; and
the wireless network node being further configured to form the superpacket from cells received from a transmitting node which segments the superpacket into the cells when the length of the superpacket exceeds the length of the fixedly given time slot and inserts the cells into several time slots wherein each of the cells includes at least two packets from the superpacket; and
the wireless network node further including means for coupling to at least two fixed network nodes via a respective wire interface, wherein the at least two fixed network nodes belong to a sub-network and exchange data with other fixed network nodes of the sub-network through wire connections.

12. A network as claimed in claim 11, wherein the wireless network node is designed for inserting the cells into several time slots of several frames.

13. A network comprising:
a plurality of network clusters each including a wireless network node and at least two fixed network nodes, wherein the at least two fixed network nodes belong to a sub-network and exchange data with other fixed network nodes of the sub-network through wire connections, each of the at least two fixed network nodes and the other fixed network nodes coupled to a respective wireless network node of the plurality of network clusters via a respective wire interface, and
wherein a transmitting wireless network node of the wireless network nodes is configured to combine several packets into a superpacket and transmit the superpacket to receiving wireless network nodes of the wireless network nodes; and
wherein the superpacket is transmitted to all wireless network nodes in one or more time slots of the fixedly given time slots wherein each of the one or more time slots includes at least two packets of the superpacket and
wherein a receiving wireless network node of the wireless network nodes after reception of a superpacket is configured to derive a packet from the superpacket if a destination of the packet of the superpacket lies in a network cluster of the plurality of network clusters corresponding to the receiving wireless network node; and
the transmitting wireless network node being configured to segment the superpacket into cells when a length of the superpacket exceeds a length of a fixedly given time slots, and to insert the cells into several time slots; and
the receiving wireless network nodes which receive the cells being configured to form the superpacket from the cells.

14. A network as claimed in claim 13, wherein the transmitting wireless network node is designed for inserting the cells into several time slots of a frame or into one or several time slots of several frames.

15. A network as claimed in claim 13, wherein one of the wireless network nodes is configured to act as a central node which is designed to control radio traffic.

16. A network as claimed in claim 13, wherein the receiving wireless network node which receives a packet is configured to compare an address identification in a control field of the packet with an address which belongs to an associated network cluster.

17. A network as claimed in claim 16, wherein the receiving wireless network node contains a table for storage of all addresses of the associated network cluster.

18. A network as claimed in claim 13, wherein the network comprises a management system which controls at least one of the wireless network nodes such that the at least one wireless network node provides establishment of point-to-point connections or point-to-multipoint connections.

19. A network as claimed in claim 18, wherein the at least one transmitting wireless network node is configured to send a key via a point-to-multipoint connection and to send coded data via a point-to-point connection.

20. A network as claimed in claim 13, wherein the transmitting wireless network node is designed for inserting the cells into several time slots of several frames.

* * * * *